United States Patent [19]

Mosel

[11] 4,274,041
[45] Jun. 16, 1981

[54] VOLTAGE COMMANDED STEPPING MOTOR CONTROL CIRCUIT

[75] Inventor: Edward F. Mosel, Bristol, Conn.

[73] Assignee: The Superior Electric Company, Bristol, Conn.

[21] Appl. No.: 924,265

[22] Filed: Jul. 13, 1978

[51] Int. Cl.² .......................................... H02K 37/00
[52] U.S. Cl. .................................................. 318/696
[58] Field of Search ....................... 318/138, 696, 685

[56] References Cited

U.S. PATENT DOCUMENTS

| | | | |
|---|---|---|---|
| 3,736,488 | 5/1973 | Abraham et al. | 318/696 |
| 3,746,958 | 7/1973 | Leenhouts | 318/696 |
| 3,787,727 | 1/1974 | McSparran | 318/696 |
| 4,153,866 | 5/1979 | Leenhouts | 318/696 |

*Primary Examiner*—B. Dobeck

[57] ABSTRACT

A stepping motor control circuit that had accepted manual adjustments for setting the stepping rate and direction of rotation of a stepping motor is made to have its stepping rate and direction controlled by the value of an analog command voltage.

6 Claims, 1 Drawing Figure

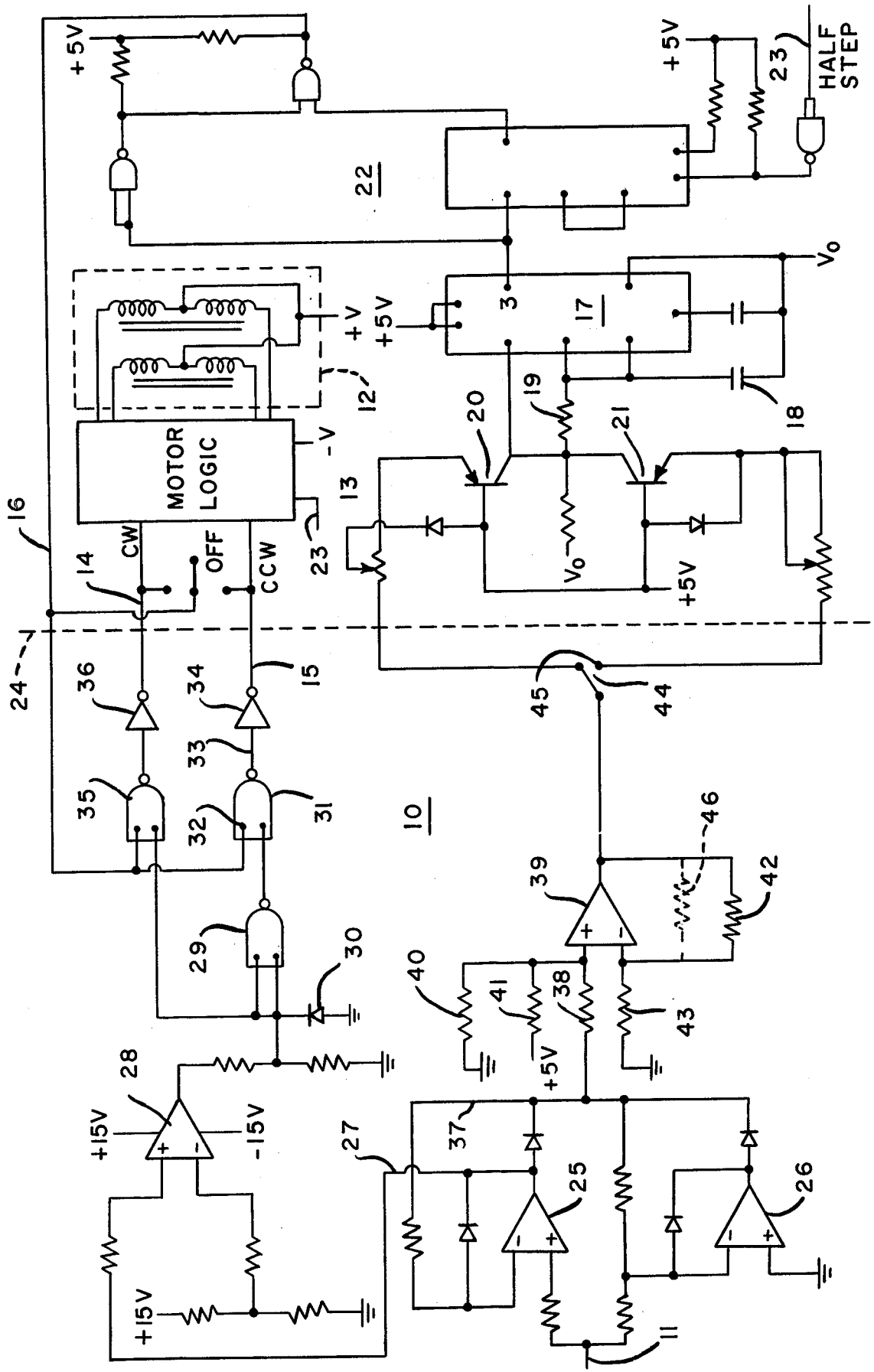

VOLTAGE COMMANDED STEPPING MOTOR CONTROL CIRCUIT

In U.S. application, Ser. No. 797,150, filed May 15, 1977, entitled "Pulse to Step Stepping Motor Control Circuit" now U.S. Pat. No. 4,153,866 and assigned to the assignee of the present invention, there is disclosed a circuit for providing changes of energization to a stepping motor in order to control the rate and direction of the movement of the motor. The direction of movement is set by the position of a manually operable switch and the motor direction cannot be changed except by operation of the switch. The rate of change of energizations are controlled by two currents applied to a timer which produces pulses related to the value of the currents while a logic circuit accepts each pulse and produces a change of energization for each pulse received. Each voltage is obtained from its own manually operable adjustable resistor with the setting of one resistor controlling the minimum or base stepping rate while the other resistor controls the maximum or running stepping rate.

While such a device has been found satisfactory, the requirement that control devices including starting and stopping be operated by manual controls, has excluded the usability of such a circuit when it is desired to have the stepping motor be automatically controlled.

It is accordingly an object of the present invention to provide a circuit for use with a pulse to step motor control which enables the value of a command voltage to set the rate and direction at which a stepping motor is operated.

Another object of the present invention is to achieve the above object with a circuit that is easily incorporated into a presently existing pulse to step motor control.

A further object of the present invention is to provide a motor control which changes the energization of a stepping motor both as to direction and rate in accordance with the value of a command voltage that is relatively economical to manufacture and reliable and durable in use.

The specific embodiment of the present invention is shown interconnected with the motor control circuit such as disclosed in the above-noted application though other and different motor circuits may be employed, if desired. The present circuit accepts a command voltage and initially determines the value of the voltage with respect to a neutral voltage with the values in one direction from the neutral value conditioning the motor for forward movement while for values in the other direction, the motor is conditioned for a reverse movement. The absolute value of the command voltage with respect to the neutral value is then directed to a pulse producing circuit or timer which produces pulses at a rate related to the absolute value.

The produced pulses are then directed through the direction conditioned circuit to cause the motor logic circuit to energize the motor to produce a step for each pulse received with the steps being in the direction set by the relative value of the command voltage.

Other features and advantages will hereinafter appear.

The sole FIGURE is an electrical schematic diagram of the present invention.

Referring to the drawing, the voltage to step control for a stepping motor of the present invention is generally indicated by the reference numeral 10 and includes a command receiving terminal 11 at which a command voltage is applied to set the stepping movement of a stepping motor 12.

The motor 12 is connected to be energized by a motor logic block 13 that provides a change of energization and hence a step in the clockwise direction of the motor for each pulse received on a lead 14 while a pulse received on a lead 15 produces a step in the counterclockwise direction. The pulses are provided on a lead 16 with the pulses being produced by the change in voltage at the output 3 terminal of a type 555 timer 17. The rate at which the pulses are produced is determined by the value of current supplied to charge a capacitor 18 through a resistor 19. Current through the resistor 19 is derived from a base speed transistor 20 or a maximum speed transistor 21. Thus, as the value of current through either transistor increases, the rate of the pulses will also increase and hence the motor's stepping rate.

Connected between the lead 16 and the output terminal 3 of the timer 17 is a circuitry 22 which dictates if each pulse from the timer is to provide energization of the motor in a full step mode having four energizations per sequence or a half step mode having eight energizing steps per sequence. A signal provided on a lead 23 selects the mode. The timer operates at the half step rate and the circuitry 22 passes each timer pulse to the lead 16 for half step energization while for the full step mode, the circuit 22 only permits half of the pulses to pass through to the lead 16.

The above-mentioned circuitry is located physically on the drawing to the right of a dotted line 24 and for a fuller description thereof, reference is made to the above-noted application.

In accordance with the present invention, when a command voltage is received at the command terminal 11, it is applied simultaneously to a pair of linear amplifiers 25 and 26 connected as shown with the connection being to the plus terminal of the amplifier 25 and the negative terminal of the amplifier 26. Accordingly, if the command voltage has a range for example between minus 5 volts and plus 5 volts with a zero voltage being the neutral voltage, a positive command voltage will appear on a lead 27 connected to the output of an amplifier 25 while a negative command voltage maintains the lead 27 at a low voltage value. The amplifiers 25 and 26 are basically interconnected to have a gain of one so that the output voltage on each is equal to the absolute value of the difference of the command voltage from the neutral voltage.

A plus voltage on the lead 27 is directed to the plus input terminal of an operational amplifier 28, also connected as an infinite gain switch and its output is a high logic voltage applied to both input terminals of a NAND gate 29. The input terminals are clamped through a diode 30 to ground to limit the negative voltage applied to the input terminals. The output of gate 29 constitutes one input to another NAND gate 31 whose other input 32 is connected to the lead 16.

The gate 29 acts as an inverter so that when the output of amplifier 28 is low, caused by a negative command voltage, i.e. less than neutral voltage, the input to the gate 31 is high, and a pulse from the lead 16, which is a high to low voltage change, will produce a low to high voltage change to the input of gate 34. A high to low voltage change constituting a pulse will be produced on the counterclockwise lead 15 to effect a change of energization of the motor.

On the other hand, if the command voltage is more than the neutral voltage or positive, the lead 27 has a high voltage, the output of amplifier 28 is high, and the output of NAND gate 29 is low so that pulses are not passed through the NAND gate 31. However, the output of amplifier 28 is connected as an input to a NAND gate 35 which has another input connected to the lead 16. When a high to low pulse appears on the lead 16, and as the other input to the gate 35 is high, the pulse passes through the gate 35 and the inverting gate 36 to produce a high to low voltage change or pulse on the clockwise lead 14. Accordingly, by use of the high gain amplifiers 25 and 26 for discrimination of the operational amplifier 28 together with the logic circuits associated therewith, differentiation of the direction of the pulses with respect to a value is accordingly effected.

The outputs of the amplifiers 25 and 26 are connected to diodes whose cathodes are connected in parallel to a lead 37 which in turn is connected through a resistor 38 to the plus terminal of an operational amplifier 39. Also connected to the plus terminal is a voltage divider which includes resistors 40 and 41 connected to ground and a plus 5 voltage source respectively so that the sum of a current to the positive terminal of amplifier 39 includes the current in the lead 37 plus the current from the voltage divider. The negative terminal of the amplifier 39 is connected to both a feedback resistor 42 from the amplifier output and to ground through a resistor 43. The amplifier 39 operates essentially as a linear amplifier to amplify the voltage on the lead 37 which in turn has a value that is essentially the absolute value of the difference in the command voltage from the neutral voltage plus the adding thereto of 5 volts from the reference voltage source through the resistor 41.

The output of the amplifier 39 is directed to the operating blade of a double pole single throw switch 44. The blade in the solid line position shown, connects the output of amplifier 39 to the base speed transistor 20 emitter so that the voltage from the amplifier 39 produces current flow in transistor 20 to charge the capacitor 18 and control the rate at which the timer 17 produces pulses in accordance with the value of the current. On the other hand, if the switch blade is connected to the other contact 45, the voltage from amplifier 39 is directed to the maximum speed transistor 21 for charging the capacitor 18 to also serve to control the rate at which the timer 17 produces pulses.

The switch 44 accordingly permits selection of the range of the rate of the output pulses to be from 0 to 2,000 pulses per second when current is conducted through the base speed transistor 20 for the maximum range of command voltages applied at the terminal 11 while if connected to operate through the maximum speed transistor 21, the command voltage range may be on the order of from 200 through 6,000 pulses per second.

In the operation of the amplifier 39, with a zero command voltage and hence a zero voltage on the lead 37, its output has a voltage of approximately 5 volts positive because of the values of resistors 38 and 40 being equal at 10 K ohms while the value of resistor 41 is 22 K ohms. The five volts on the output of amplifier 39 is insufficient to cause transistors 20 and 21 to conduct, and as resistor 38 has a value of 10 K ohms, it has a weighted effect on the value of the voltage on the positive terminal of the amplifier 39 and is added to the volts applied from the resistor 41. This increase in the positive input voltage to the amplifier 39 enables its output voltage to immediately increase above the five volts necessary to cause conduction of transistor 20 and 21. Accordingly, the output voltage of the amplifier 39 may range from 5 to 15 volts for changes in the command voltage of only 0–5 volts absolute.

If it is desired to have a different range of the command voltage, as for example from minus 10 to plus 10 volts, then the value of the resistor 42 may be changed to 8.57 K ohms instead of 20 K ohms in order to maintain the same range of output voltage from the amplifier 39 of between 5 and 15 volts required by the timer 17 for a zero to 10 volt change in the lead 37. The change may be effected by adding a resistor of 15 K ohms as shown in dotted lines and indicated by the reference numeral 47.

The amplifiers may be type LM324, the gates, type 7400 and the inverters type 7404.

While the circuit disclosed in the aforementioned application includes the ability to control the rate of increase of the pulses from the timer, the present circuit depends upon the value of the command voltage to control the rate of increase and decrease.

It will accordingly be understood that there has been disclosed a circuit for enabling the value of a voltage to control the direction and rate of movement of a stepping motor. The direction of the value of the command voltage from a neutral value sets the direction of movement while its absolute value from the neutral value controls the rate at which pulses and hence steps of the motor are produced.

Variations and modifications may be made within the scope of the claims and portions of the improvements may be used without others.

I claim:

1. A voltage commanded stepping motor control circuit for having the value of a command voltage control the direction and rate of movement produced by a stepping motor in which each pulse received is translated into a step comprising terminal means connected to receive the command voltage with the voltage having a value within a range that includes a neutral voltage, direction means connected to the terminal means for providing a signal indicative of the direction of the command voltage from the neutral value, oscillator means for producing pulses in accordance with the value of a received electrical signal, means for producing an electrical signal to the oscillator means that is related to the absolute value of the command voltage and motor logic means for receiving the pulses and the direction signal and directing the motor to produce a step in the direction dictated by the direction signal for at least every other pulse.

2. The invention as defined in claim 1 in which the oscillator means produces pulses within a base speed range or a maximum speed range and in which the means for producing the electrical signal includes means for selecting one of the speed ranges.

3. The invention as defined in claim 1 in which the values of the command voltage are within at least one voltage range and in which the means for producing the electrical signal includes a bias circuit for normally operating the means above the absolute value of the one range.

4. The invention as defined in claim 3 in which the values of the command voltage are within a second voltage range and in which the means for producing the electrical signal requires only a change in one resistance value to operate with command voltages in the second range.

5. The invention as defined in claim 1 in which the direction means includes a pair of amplifiers connected as unity gain switches, in which the command voltage is applied as an input simultaneously to both amplifiers and in which one amplifier changes its output to provide a direction signal only when the command voltage is in one direction from the neutral value.

6. The invention as defined in claim 5 in which the amplifiers are connected to have essentially unity gain, in which the command voltages are applied inversely to the amplifiers, and in which the output of the amplifiers are connected in parallel with the value of the output from the amplifiers being the absolute value of the command voltage from the neutral value.

* * * * *